United States Patent
Hsieh et al.

[11] Patent Number: 6,136,921
[45] Date of Patent: Oct. 24, 2000

[54] COUPLED POLYMERS AND PROCESS FOR PREPARING THE SAME

[75] Inventors: Henry Chi-Chen Hsieh; Sean Chwan-Sheng Huang; James Kung-Hsi Chan, all of Kaohsiung Hsien, Taiwan

[73] Assignee: Taiwan Synthetic Rubber Corperation, Taipei, Taiwan

[21] Appl. No.: 09/207,323

[22] Filed: Dec. 7, 1998

[51] Int. Cl.[7] .................................... C08F 08/08
[52] U.S. Cl. ........................... 525/107; 525/108; 525/98; 525/423
[58] Field of Search .................... 525/107, 108, 525/98, 423

[56] References Cited

U.S. PATENT DOCUMENTS

| | | | |
|---|---|---|---|
| 3,134,745 | 5/1964 | Dennis | 260/45.5 |
| 3,281,383 | 10/1966 | Zelinski et al. | 260/23.7 |
| 3,468,972 | 9/1969 | Hsieh | 260/836 |
| 3,627,837 | 12/1971 | Webb | 260/836 |
| 4,108,945 | 8/1978 | Fetters et al. | 260/880 B |
| 4,584,346 | 4/1986 | Kitchen | 525/314 |

FOREIGN PATENT DOCUMENTS

| | | | |
|---|---|---|---|
| 0 153 727 A2 | 9/1985 | European Pat. Off. | C08F 297/04 |
| 0 643 094 A1 | 3/1995 | European Pat. Off. | |
| 166083 | 8/1936 | Japan. | |
| 3-281515 | 12/1991 | Japan. | |
| 3-287617 | 12/1991 | Japan. | |

| | | | |
|---|---|---|---|
| WO 99/01490 | 1/1999 | WIPO. | |

OTHER PUBLICATIONS

WPI Abstract Accession No. 92–036272 [05] and JP 030281651 A (NIPPON ELASTOMER)Dec. 12, 1991.
Preliminary Search Report, Republic of France, Aug. 11, 1999 for application Nos. FA 566749 and FR9816043.

*Primary Examiner*—James J. Seidleck
*Assistant Examiner*—Olga Asinovsky
*Attorney, Agent, or Firm*—Harold L. Novick; Nath & Associates

[57] ABSTRACT

The present invention provides a coupled polymer, which is prepared by reacting a living alkali metal-terminated polymer with a particular coupling agent. The coupling agent has the formula

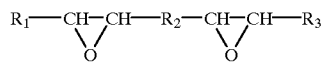

(I)

where R1, R3 are independently selected from the group consisting of aliphatic alkyl and alkenyl, and hydrogen, and $R_2$ is alkylene, alkenylene, divalent cycloalkylene, divalent arenyl, or a $C_{1-17}$ divalent hydrocarbyl containing ether or ketone group. By means of the particular coupling agent, the coupling efficiency is relatively high, and no harmful materials will be generated to corrode the pipes. The coupled polymer obtained has a coupling number of less than 3, and good rubbery physical properties, transparency, and wear resistance.

13 Claims, No Drawings

COUPLED POLYMERS AND PROCESS FOR PREPARING THE SAME

BACKGROUND OF THE INVENTION

1. Field of the Invention

The present invention relates to a novel coupled polymer, and more particularly to a process for preparing the novel coupled polymer by using a particular coupling agent.

2. Description of the Prior Art

Living alkali metal-terminated polymers have been produced by polymerizing conjugated dienes or polymerizing conjugated dienes and monovinyl arenes in the presence of an organic alkali metal compound as an initiator. Such a living polymer is then reacted with a coupling agent to form a linear or star polymer. The coupling center of the coupling agent thereby becomes a nucleus for such a polymer. Such coupling is relatively efficient and stable and has been used for the production of polybutadiene rubbers, styrene-butadiene rubbers, and thermoplastic elastomers, such as styrene-butadiene-styrene (SBS), styrene-isoprene-styrene (SIS), styrene-ethylene/butene-styrene (SEBS), and styrene-ethylene/propylene-styrene (SEPS).

The conventional coupling agents used for coupling have some problems. British Patent 1014999 uses a dihalogenated hydrocarbon as a coupling agent to prepare an ABCBA coupled block copolymer, which is formed by the reaction of the coupling agent and copolymeric carbanion AB⁻. Such a coupling agent has a problem that by-products (such as chloride of the alkali metal) are generated, which will not only erode the pipes, but also remain in the rubber and react with the anti-aging agent to yellow the rubber; thus, the rubber obtained is opaque. In addition, such a coupling agent has been banned by many countries because of its toxicity.

British Patent 1103939 uses carbon dioxide, carbon disulfide, or carbonyl sulfide as the coupling agent to form an ABCBA coupled block copolymer. Such a coupling agent has low efficiency. Since carbon dioxide is a gas, it is very difficult to control its dissolved concentration. In addition, sulfide by-products will be generated after coupling, contaminating the polymer and causing the problem of wastewater.

U.S. Pat. No. 3,668,279 uses maleic anhydride or dimethylene terephihalate as the coupling agent. The problems are that the coupling efficiency is low, the coupled polymer solution is yellow, and the alcohol by-products will poison the organic alkali metal initiator.

U.S. Pat. Nos. 3,244,664, 3,692,874, 3,880,954, 3,725,369 use silicon halide, siloxane, silyl amine, or silyl sulfide as the coupling agent. Most of the polymers obtained are star polymers and the coupling efficiency (coupling ratio) is high. However, by-products including alcohols, organic amines, and thiols will be generated, which will remain in the recovered solvent, thus poisoning the organic alkali metal initiator. Moreover, the polymer obtained will have the bad odor of amines or thiols.

U.S. Pat. No. 4,039,633 uses 1,3,5-benzenetricarboxylic acid trihalogen as the coupling agent. The result is that a large amount of uncoupled polymers and coupled polymers with an uncertain coupling number are formed. Since the coupled polymer contains a carboxyl group, it easily become yellow. Moreover, the alkali metal halide will erode the pipes and make the product opaque.

U.S. Pat. No. 3,468,972 uses polyepoxides, polyisocyanates, polyimines, polyaldehydes, polyketones, polyanhydrides, polyesters, or polyhalides as the coupling agent. It is very difficult to control the coupling number, and the star polymer obtained is the mixture of coupled polymers with various coupling numbers. Moreover, the coupling agent has a high molecular weight, thus it is difficult to dissolve in hydrocarbon compounds. The coupling efficiency is lower than 60%, the product has undesired color and odor, and it is often accompanied by by-products of alcohols or halides.

U.S. Pat. No. 3,281,383 uses styrene-acid anhydride copolymer, epoxy liquid polybutadiene, or polyphenyl isocyanate as the coupling agent. The disadvantages are similar to those mentioned in U.S. Pat. No. 3,468,972.

U.S. Pat. No. 4,107,236 uses diesters or silicon halides as the coupling agent. The disadvantages are similar to those mentioned in U.S. Pat. Nos. 3,244,664 and 3,668,279.

U.S. Pat. No. 3,985,8330 uses m-divinylbenzene as the coupling agent. The coupling efficiency is not high, and the range of the arm number is undesirably broad. That is, the arm number can be 2 (linear polymer) or 12 (star polymer). In addition, the commercially available divinylbenzene is usually a mixture of para, ortho, and meta; therefore, the applicability of m-divinylbenzene as the coupling agent is restricted.

U.S. Pat. No. 4,049,753 uses an anhydride of a monocarboxylic acid as the coupling agent to prepare a polymer having ether or alcohol groups on its coupling center. The coupling efficiency is not high and the polymer (rubber) obtained will turn yellow because of the presence of anhydride and carboxylic acid. Moreover, the rubber has inferior transparency.

SUMMARY OF THE INVENTION

An object of the present invention is to solve the above-mentioned problems and to use a particular coupling agent to prepare a coupled polymer. No harmful by-products will be generated, and the coupling ratio can reach higher than 70%.

Another object of the present invention is to provide a coupled polymer having a coupling number (arm number) equal to or less than 3.

Another object: of the present invention is to provide a coupled polymer having better transparency than star polymers.

Another object of the present invention is to provide a coupled polymer having better wear resistance than star polymers, suitable for use in the soles of shoes.

Another object of the present invention is to provide a coupled polymer that can withstand the presence of diblock copolymers and will not impair the physical properties of the diblock copolymers significantly.

A further object of the present invention is to provide an easily-applied process using an aliphatic or aromatic compound having two epoxy groups or its ether or ketone as the coupling agent to couple a living alkali metal-terminated polymer. No harmful by-products will be generated, and the coupling ratio can reach higher than 70%.

To achieve the objects, the coupled polymer of the present invention is prepared by reacting a living alkali metal-terminated polymer with a coupling agent, wherein the living alkali metal-terminated polymer has the formula P-M, where M is an alkali metal, P is a polymeric carbanion of one or more conjugated dienes having 4–12 carbon atoms, or a polymeric carbanion of one or more conjugated dienes having 4–12 carbon atoms and one or more monovinylarenes having 8–18 carbon atoms, wherein the coupling agent has the formula

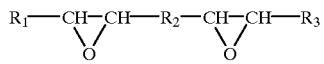
(I)

where R1, R3 are independently selected from the group consisting of aliphatic alky and alkenyl, and hydrogen, and $R_2$ is alkylene, alkenylene, divalent cycloalkylene, divalent arenyl, or a $C_{1-17}$ divalent hydrocarbyl containing ether or ketone group.

DETAILED DESCRIPTION OF THE INVENTION

The conjugated diene monomer that can be polymerized into the polymeric carbanion P can be selected from the group consisting of 1,3-butadiene, 2,3-dimethyl-1,3-butadiene, 3-butyl-1,3-octadiene, isoprene, piperylene, 2-phenyl-1,3-butadiene, and mixtures thereof.

The monovinylarene monomer that can be polymerized into the polymeric carbanion P can be selected from the group consisting of styrene, methylstyrene (particularly 3-methylstyrene, α-methylstyrene), propylstyrene (particularly 4-propylstyrene), cyclohexylstyrene (particularly 4-cyclohexylstyrene), para-tolylstyrene, 1-vinyl-5-hexylnaphthalene, vinylnaphthalene (particularly 1-vinylnaphthalene), and mixtures thereof.

The polymeric chain P can be a carbanion formed from a homopolymer of a single conjugated diene monomer, a copolymer of conjugated diene monomers, or a copolymer of conjugated diene monomers and monovinylarene monomers. Such a copolymer can be a random, tapered block, or complete block copolymer of various monomers. For example, P can be a block copolymer of styrene and butadiene, or a block copolymer of styrene and isoprene. In such a block copolymer, either butadiene or isoprene can bond to the alkali metal ion.

The polymeric chain P can have the structure of A-B, in which A represents a block of ronovinylarenes, and B represents a polymeric chain that confers rubbery properties. The polymeric chain B can be a conjugated diene block, a copolymer of conjugated dienes and monovinylarenes, or any polymeric chain that can exhibit rubber properties. Such a polymer exhibits properties both of an elastomer and of a thermoplastic polymer. Therefore, such coupled polymers can be formed into articles by standard procedures known for producing articles from thermoplastic polymers while the finished article exhibits elastomeric properties.

Regarding the living alkali metal-terminated polymer P-M of the present invention, the alkali metal is selected from the group consisting of lithium, sodium, potassium, rubidium, and cesium, preferably lithium.

The molecular weight of the coupled polymers of the present invention can vary in broad ranges. For the usual applications of the coupled polymers, the number average molecular weight will be in the range of about 1,000 to about 2,000,000.

According to the present invention, the coupling agent suitable for use has the formula

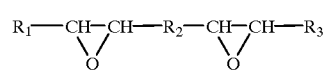
(I)

where $R_1$, $R_3$ are independently selected from the group consisting of aliphatic alkyl and alkenyl, and hydrogen, and $R_2$ is alkylene, alkenylene, divalent cycloalkylene, divalent arenyl, or a $C_{1-17}$ divalent hydrocarbyl containing ether or ketone group. When $R_2$ is a $C_{1-17}$ divalent hydrocarbyl containing ether or ketone group, $R_2$ can be, for example, —$R_4$—O—$R_5$— or

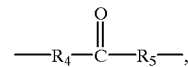

wherein R4 and $R_5$ are independently $C_{0-17}$ alkylene or arylene.

According to the above descriptions, the coupling agent used in the present invention can be a diepoxy compound, which can be prepared by any known methods; for example, the methods (1), (2), and (3) described as follows are suitable:

(1) A synthetic diolefin, is directly reacted with oxygen in the presence of a catalyst.

(2) A natural or synthetic diolefin is reacted with a peroxy acid or hydrogen peroxide. The residual acid or water contained in the diepoxy compound obtained should be controlled to less than 0.1 wt %, or else the living alkali metal-terminatedpolymer will be deactivated, thus decreasing the coupling ratio and resulting in a product with an undesired color and inferior transparency.

(3) A diphenol or diol compound is reacted with a halogen terminated epoxy compound in the presence of an alkali catalyst (such as NaOH), and then HCl is eliminated. The ratio of the reactants should be properly controlled so as to have a minimum amount of alcohol and halogen groups. In addition, the impurities contained in the reactants should be removed to lower than 0.1 wt %, or else the impurities will deactivate the living alkali metal-terminated polymer, thus decreasing the coupling ratio and resulting in a product with an undesired color and inferior transparency.

No matter how the diepoxy coupling agent used in the present invention is prepared, such a coupling agent should have no functional groups of alcohol, ester, halogen or carboxyl.

Also, the impurities contained in the coupling agent, including water, peroxy acids, carboxylic acids, hydrogen halides, halogenated alkali metals, salts, halogen terminated-epoxy compounds, diols, diphenols, should be lower than 0.1 wt %, preferably lower than 0.01 wt %.

The coupling agent suitable for use in the present invention can contain alkyl, and such representative examples include methylpezntane dioxide, butadiene dioxide, dimethylpentane dioxide, pentane dioxide, hexane dioxide, heptane dioxide, octane dioxide, and decane dioxide. The suitable coupling agent can contain cycloalkyl, and such representative examples include vinylcyclohexane dioxide, limonene dioxide, cyclohexane dioxide, cyclooctane dioxide, and dicyclopentadiene dioxide. The suitable coupling agent can contain arenyl, and representative examples include divinylbenzene dioxide. The suitable coupling agent can contain an ether group, and representative examples include diglycidyl ether, butanediol diglycidyl ether, ethylene glycol diglycidyl ether, hexanediol diglycidyl ether, diethylene glycol diglycidyl ether, di(2,3-epoxycycloamyl)ether, diglycidyl ether of resorcinol, 2-glycidyl phenyl glycidyl ether, epoxidizecd saligenin, 3-(3, 4-epoxy hexane)-8,9-epoxy-2,4-dioxaspiro-5,5-undecane, and 4,4'-isopropylidenediphenol.

The coupling ratio and the properties of the coupled polymer obtained are dependent upon the amount of coupling agent used. The suitable amount of the coupling agent is such that the molar ratio of the coupling agent to the living alkali metal-terminated polymer is between 0.05 and 3.5, preferably between 0.2 and 2.5.

The temperature at which the coupling reaction is carried out can vary over a broad range and, for convenience, is often the same as the temperature of polymerization. Although the temperature can vary broadly from about 0° C. to 200° C., it is preferably within the range of about 50° C. to 120° C.

The coupling reaction is normally carried out by simply mixing the coupling agent, neat or in solution, with the living polymer solution. The reaction time required is usually quite short. The normal duration of the coupling reaction will be in the range of 1 minute to 1 hour. Longer coupling periods may be required at lower temperatures.

After the coupling reaction, the coupled polymers are recovered by treating the reaction mixture with terminating agents containing active hydrogen such as alcohols or water or aqueous acid solutions or mixtures thereof. It is usually preferred to add an antioxidant to the reaction mixture before isolation of the coupled polymer.

The polymer is separated from the reaction mixture by standard techniques, such as steam stripping or coagulation with a suitable non-solvent such as an alcohol. The coagulated or stripped polymer is then removed from the resulting medium by, e.g., centrifugation or extrusion. Residual solvent and other volatiles can be removed from the isolated polymer by heating, optionally under reduced pressure or in a forced air flow.

Compounding ingredients such as fillers, dyes, pigments, softeners and reinforcing agents can be added to the polymer during compounding operations.

In accordance with an embodiment of this invention, there is provided a process for producing the coupled polymers as defined above. This process includes basically two steps. The first step is the step in which a living polymer having the formula P-M is produced. The second step is that in which the living polymer is coupled with the coupling agent of this invention as defined above.

The first step of this process is carried out by reacting a mono-functional alkali metal initiator system with the respective monomer or monomers to form the living polymeric chain P-M. This polymerization step can be carried out in one step or in a sequence of steps. In the case where the polymeric chain P is a homopolymer or a random or tapered copolymer of two or more monomers, the monomers are simultaneously polymerized with the alkali metal initiator. In the case where the polymeric chain P is a block copolymer comprising two or more homo- or copolymer blocks, these individual blocks can be generated by incremental or sequential monomer addition.

The alkali metal-based initiator systems used in the first step of the process of making the coupled polymers of the present invention are based on alkali metal having the general formula $R^1$—M, wherein $R^1$ is a hydrocarbyl radical of 1 to about 20 carbon atoms, and M is an alkali metal selected from lithium, sodium, potassium, rubidium, or cesium. Examples of such lithium initiators are methyllithium, isopropyllithium, n-butyllithium, sec-butyllithium, isobutyllithium, t-butyllithium, t-octyllithium, hexyllithium, n-undecyllithium, phenyllithium, naphthyllithium, p-tolyllithium, 4-phenylbutylLithium, cyclohexyllithium, and 4-cyclohexylbutyllithium. The amount of the lithium metal initiator employed depends upon the desired properties of the polymer, particularly the desired molecular weight. Normally the organomonolithium initiator is employed in the range of about 0.1 to 100 gram millimoles per 100 grams of total monomers.

The polymerization reaction is carried out in the presence of a hydrocarbon solvent. The hydrocarbon solvent can be a paraffinic hydrocarbon, such as pentane, hexane, heptane, octane, decane, or 2,2,4-trimethylpentane; a cycloalkyl hydrocarbon, such as cyclopentane, cyclohexane, methylcyclohexane, ethylcyclohexane, or 1,4-dimethylcyclohexane; or an aromatic hydrocarbon, such as benzene, toluene, ethylbenzene, xylene, diethylbenzene, or propylbenzene. These solvents can be used singly or in combination. Cyclohexane and n-hexane are preferred.

Generally, if the solvent used is a hydrocarbon, the polymerization speed of monovinylarenes or conjugated dienes is quite slow, and the difference between the two in terms of polymerization reactivity is great. A polar solvent can be added to solve these problems. However, when the quantity of the polar solvent is too high, the structure of the copolymer of monovinylarene and conjugated diene will be changed from tapered block into random. Therefore, the quantity of the polar solvent should be limited to a proper range. Suitable polar solvents include ethers such as tetrahydrofuran, diethyl ether, cycloamyl ether, dipropyl ether, ethylene dimethyl ether, ethylene diethyl ether, diethylene glycol, or dimethyl ether, preferably tetrahydrofuran or diethyl ether; and tertiary amines such as trirnethyl amine, triethyl amine, or tripropyl amine, preferably triethyl amine.

The reaction is generally carried out with a weight ratio of solvent to monomers exceeding 1. Preferably, the solvent is employed in a quantity between about 400 to about 1500 parts by weight per 100 parts by weight of total monomers.

This polymerization reaction in step 1 usually occurs within a period of time ranging from a few minutes up to about 8 hours. Preferably, the reaction is carried out within a time period of about 30 minutes to about 4 hours. The polymerization temperature is not critical and will generally be in a range of about 0° C. to about 200° C., preferably in a range of about 40° C. to about 130° C.

In order to carry out the second coupling step, the polymerization mixture is blended with the coupling agent at the conclusion of the polymerization. This is done before any material that would terminate the polymerization reaction or remove the lithium metal atom from the polymeric chain is added to the reaction mixture. Thus, the blending of the polymerization mixture and the coupling agent is carried out before any material such as water, acid or alcohol, is added to inactivate the living polymer. The second step of coupling the living polymer is thus carried out as described in detail above.

Various materials are known to be detrimental to the lithium metal-initiated polymerization. Particularly, the presence of carbon dioxide, oxygen, water, alkynes, halides, alcohols, organic acids, and inorganic acids should be avoided during an organomonolithium-initiated polymerization reaction of step 1 of this combined process for making the coupled copolymers. Therefore, it is generally preferred that the reactant initiators and the equipment be free of these materials and that the reaction be carried out under an inert gas such as nitrogen.

According to the present invention, a particular coupling agent with good coupling efficiency is used to couple a living alkali metal-terminated polymer. By the use of such a particular coupling agent, no halides will be generated to corrode the pipes, and no alcohols or acids will be formed to poison the living polymer. The coupled polymer obtained has a coupling number less than 3, which is significantly different from star polymers having a coupling number larger than 3. The coupled polymer of the present invention not only has good rubbery physical properties, but also has better transparency than conventional coupled polymers. Also, the coupled polymer of the present invention has better wear resistance than conventional star polymers.

The following examples are intended to illustrate the process and the advantages of the present invention more fully without limiting its scope, since numerous modifications and variations will be apparent to those skilled in the art.

Six kinds of lithium-terminated polymers are reacted with various coupling agents under nitrogen to produce coupled polymers, which are described below.

EXAMPLES 1–3 AND COMPARATIVE EXAMPLES 1–4

In a solution of styrene (95 g) in cyclohexane (1860 g), 0.3 ml of tetrahydrofuran and 9.3 g of 5 wt % n-butyllithium solution were added to initiate polymerization. The reaction was continued for 30 minutes, and the temperature was increased from 40° C. to 55° C. After most of the styrene monomer was reacted, 210 g of butadiene solution was added into the polymer mixture. The reaction was continued for an additional 90 minutes, and the temperature was increased from 55° C. to 80–90° C. After all of the butadiene monomer was completely reacted, a living styrene-butadiene block copolymer was formed in the first step.

Such a living block copolymer was reacted with various coupling agents at 70–85° C. for 30 minutes. 0.2 phr of a sterically hindered phenolic antioxidant was added into the coupled polymer solution, which was then steam stripped. The molecular weight and the coupling number of the dry polymer were determined by GPC analysis. The results are shown in Table 1.

COMPARATIVE EXAMPLES 5–7

In a solution of styrene (41 g) in cyclohexane (1100 g), 0.3 ml of tetrahydrofuran and 1.2 g of 15 wt % n-butyllithium solution were added to initiate polymerization. The reaction was continued for 30 minutes, and the temperature was increased from 40° C. to 50° C. After most of the styrene monomer was reacted, 123 g of isoprene solution was added into the polymer mixture. The reaction was continued for an additional 90 minutes, and the temperature was increased from 55° C. to 80–90° C. After all of the isoprene monomer was completely reacted, a living styrene-isoprene block copolymer was formed in the first step.

Such a living block copolymer was reacted with various coupling agents at 70–85° C. for 30 minutes. The subsequent procedures were employed according to those described in Examples 1–3. The results are shown in Table 2.

COMPARATIVE EXAMPLES 8 and 9

In a solution of styrene (95 g) in cyclohexane (1860 g), 0.3 ml of tetrahydrofuran and 2.94 g of 15 wt % n-butyllithium solution were added to initiate polymerization. The reaction was continued for 30 minutes, and the temperature was increased from 40° C. to 50° C. After most of the styrene monomer was reacted, 210 g of butadiene solution was added into the polymer mixture. The reaction was continued for an additional 90 minutes, and the temperature was increased from 55° C. to 80–90° C. After all of the butadiene monomer was completely reacted, a living styrene-butadiene block copolymer was formed in the first step.

Such a living block copolymer was reacted with various coupling agents at 70–85° C. for 30 minutes. The subsequent procedures were employed according to those described in Examples 1–3. The results are shown in Table 3.

COMPARATIVE EXAMPLES 10–12

The same procedures as described in Comparative Examples 8 and 9 were employed except that 3.83 g of 15% n-butyllithium solution was used. The results are shown in Table 4.

EXAMPLE 4 AND COMPARATIVE EXAMPLE 13

The same procedures as described in Comparative Examples 5–7 were employed except that 72 g of styrene and 108 g of butadiene were used. The results are shown in Table 5.

From the above data, it can be seen that by means of the particular coupling agent of the present invention, the coupled polymer obtained (see Examples 1–4) has high coupling is efficiency (higher than 70%), good transparency (higher than 70%), good color (yellowness less than 10), and superior wear resistance compared to that of the coupled polymer obtained from using silicon tetrachloride.

TABLE 1

|  | Example | | |
|---|---|---|---|
|  | 1 | 2 | 3 |
| Coupling Agent | 1,2,7,8-diepoxy octane | 1,4-butanediol diglycidyl ether | butadiene dioxide |
| The Molar Ratio of n-Butyllithium/ Coupling Agent | 2.2 | 2.0 | 1.9 |
| Coupling Efficiency (%) | 93 | 90 | 85 |
| Coupling Number | 1.90 | 1.85 | 1.91 |
| Mw of Coupled Polymer (×10$^{-4}$) | 13.8 | 13.7 | 14.7 |
| Color of the Polymer Solution | transparent, water-like | transparent, water-like | transparent, water-like |
| Tensile Strength (kg/cm$^2$) | 251 | 283 | 220 |
| Elongation Ratio (%) | 788 | 830 | 873 |
| 300% Mold Number (kg/cm$^2$) | 28.5 | 23.5 | 28.9 |
| Hardness (shore A) | 78 | 79 | 68 |
| Color of Granules (Yellowness)** | 8 | 7.1 | 6.5 |
| Transparency* | 79.7 | 73.0 | 79.7 |
| By-products from Coupling | none | none | none |

|  | Comparative Example | | | |
|---|---|---|---|---|
|  | 1 | 2 | 3 | 4 |
| Coupling Agent | p-dichloro-toluene | 1,2-dibromo-ethane | methyl benzoate | p-benzo-quinone |
| The Molar Ratio of n-Butyllithium/ Coupling Agent | 2.0 | 1.8 | 2.2 | 2.2 |
| Coupling Efficiency (%) | 70.4 | 75.5 | 74.9 | 34.8 |

TABLE 1-continued

| | | | | |
|---|---|---|---|---|
| Mw of Coupled Polymer (×10⁻⁴) | 14.75 | 14.36 | 11.7 | 17.7 |
| Polymer Solution | semi-transparent, cloudy | semi-transparent, cloudy | transparent, colorless | green |
| Tensile Strength (kg/cm²) | 267 | 273 | 257 | 200 |
| Elongation Ratio (%) | 920 | 830 | 920 | >1200 |
| 300% Mold Number (kg/cm²) | 23 | 27.5 | 22.7 | 14.6 |
| Hardness (Shore A) | 75 | 77 | 77 | 72 |
| Color of Granules** | 26.7 | 7.1 | 21.3 | 132.3 |
| Transparency* | 39.2 | 41.3 | 21.3 | 26.6 |
| By-products from Coupling | lithium chloride | lithium bromide | methanol | none |

*The transparency is measured by irradiating a 2 mm test sheet with UV light.
**High yellowness indicates a darker yellow color.

TABLE 2

| | Comparative Example | | |
|---|---|---|---|
| | 5 | 6 | 7 |
| Coupling Agent | Acetic Anhydride | Butyl Acetate | 1,2-dibromo-ethane |
| Molar Ratio of n-Butyllithium/ Coupling Agent | 2/3 | 2/1 | 2/1 |
| Mw of Uncoupled Polymer (×10⁻⁴) | 8.8 | 8.1 | 9.1 |
| Mw of Coupled Polymer (×10⁻⁴) | 16.6 | 14.7 | 17.5 |
| Coupling Number | 1.89 | 1.81 | 1.92 |
| Coupling Efficiency (%) | 65 | 77 | 72 |
| Tensile Strength (kg/cm²) | — | 133 | 155 |
| Elongation Ratio (%) | — | 1160 | >1200 |
| 300% Mold Number (kg/cm²) | — | 14 | 14 |
| Transparency | 25 | 60 | 32 |
| Polymer Solution | pale yellow, cloudy | transparent, water-like | semi-, transparent, cloudy |
| By-products from Coupling | none | ethanol | lithium bromide |

TABLE 3

| | Comparative Example | |
|---|---|---|
| | 8 | 9 |
| Coupling Agent | epoxy linseed oil (Mw ~ 1000, epoxy amount is higher than 9%) | epoxy soybean oil (Mw ~ 1000, epoxy amount is higher than 9%) |
| Quantity of Coupling Agent | 6.0 parts/100 parts of total monomer | 3.0 parts/100 parts of the total monomer |
| Coupling Efficiency | 61.0 | 60.8 |
| Mw of Coupled polymer (×10⁻⁴) | 21.6 | 7.9 |
| Mw of Uncoupled polymer (×10⁻⁴) | 11.0 | 15.4 |
| Coupling Number | 1.96 | 1.95 |
| Tensile Strength (kg/cm²) | 149 | 160 |
| Elongation Ratio (%) | 844 | 844 |
| 300% Mold Number (kg/cm²) | 17.6 | 18.1 |
| Transparency | 33.6 | 68.6 |
| Polymer Solution | transparent, yellow | transparent, colorless |
| Color of Granules (Yellowness) | 26.2 | 8.9 |

TABLE 4

| | Comparative Example | | |
|---|---|---|---|
| | 10 | 11 | 12 |
| Coupling Agent | 3-ethyl-2,4-pentane ketone | phthalic anhydride | terephthalic aldehyde |
| Molor Ratio of n-Butyllithium/ Coupling Agent | 2.2 | 2.2 | 2.5 |
| Mw of Uncoupled Polymer (×10⁻⁴) | 6.67 | 5.7 | 6.9 |
| Mw of Coupled Polymer (×10⁻⁴) | 13.3 | 11.7 | 13.2 |
| Coupling Number | 1.99 | 2.05 | 1.91 |
| Coupling Efficiency | 34.2 | 54.3 | 70 |
| Transparency | 48 | 32 | 52 |

TABLE 5

| | Example 4 | Comparative Example 13 |
|---|---|---|
| Coupling Agent | 1,2,7,8-diepoxy octane | silicon tetrachloride |
| Quantity of n-Butyllithium (g) | 0.245 | 0.344 |
| Molar Ratio of n-Butyllithium/ Coupling Agent | 2.2 | 4.4 |
| Mw of Uncoupled Polymer (×10⁻⁴) | 10.7 | 5.4 |
| Mw of Coupled Polymer (×10⁻⁴) | 19.0 | 16.2 |
| Coupling Number | 1.83 | 3.0 |
| Coupling Efficiency | 85 | 90 |
| Tensile Strength (kg/cm²) | 282 | 308 |
| Elongation Ratio (%) | 750 | 695 |
| 300% Mold Number (kg/cm²) | 36 | 47.6 |
| Polymer Solution | transparent, colorless | semi-transparent, cloudy |
| Wear Resistance (Akron, 15° × 6 lb × 3300 rev) | 0.146 | 0.541 |
| Transparency | 82 | 23 |

What is claimed is:

1. A coupled polymer, which is prepared by reacting a living alkali metal-terminated polymer with a coupling agent, wherein the living alkali metal-terminated polymer has the formula P-M, where M is an alkali metal, P is a polymeric carbanion of one or more conjugated dienes having 4–12 carbon atoms, or a polymeric carbanion of one or more conjugated dienes having 4–12 carbon atoms and one or more monovinylarenes having 8–18 carbon atoms, wherein the coupling agent has the formula:

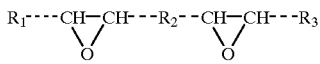
(I)

where $R_1$, $R_3$ are independently selected from the group consisting of aliphatic alkyl and alkenyl, and hydrogen, and $R_2$ is alkylene, alkenylene, divalent cycloalkylene, or divalent arenyl.

2. The coupled polymer as claimed in claim 1, wherein the conjugated diene is selected from the group consisting of 1,3-butadiene, 2,3-dimethyl-1,3-butadiene, 3-butyl-1,3-octadiene, isoprene, piperylene, 2-phenyl-1,3-butadiene, and mixtures thereof.

3. The coupled polymer as claimed in claim 1, wherein the monovinylarene is selected from the group consisting of styrene, methylstyrene, propylstyrene, cyclohexylstyrene, para-tolylstyrene, 1-vinyl-5-hexylnaphthalene, vinylnaphthalene, and mixtures thereof.

4. The coupled polymer as claimed in claim 1, wherein the coupling agent contains less than 0.1 wt % of impurities and the impurity is selected from the group consisting of water, peroxy acids, carboxylic acids, hydrogen halides, halogenated alkali metals, salts, halogen terminated-epoxy compounds, diols, diphenols, and mixtures thereof.

5. The coupled polymer as claimed in claim 1, wherein the alkali metal is selected from the group consisting of lithium, sodium, potassium, rubidium, and cesium.

6. The coupled polymer as claimed in claim 5, wherein the alkali metal is lithium.

7. The coupled polymer as claimed in claim 1, wherein the molar ratio of the coupling agent to the living alkali metal-terminated polymer is between 0.05 and 3.5.

8. The coupled polymer as claimed in claim 1, which has a coupling number smaller than 3.

9. The coupled polymer as claimed in claim 1, wherein none of $R_1$, $R_2$, or $R_3$ has alcohol, ester, halogen and carboxyl groups.

10. The coupled polymer as claimed in claim 1, wherein P is a block polymer of styrene and butadiene, or a block polymer of styrene and isoprene.

11. The coupled polymer as claimed in claim 1, wherein the coupling agent contains alkyl and is selected from the group consisting of methylpentane dioxide, butadiene dioxide, dimethylpentane dioxide, pentane dioxide, hexane dioxide, heptane dioxide, octane dioxide, and decane dioxide.

12. The coupled polymer as claimed in claim 1, wherein the coupling agent contains arenyl and is divinylbenzene dioxide.

13. A process for preparing a coupled polymer, comprising reacting a living alkali metal-terminated polymer with a coupling agent, wherein the living alkali metal-terminated polymer has the formula P-M, where M is an alkali metal, P is a polymeric carbanion of one or more conjugated dienes having 4–12 carbon atoms, or a polymeric carbanion of one or more conjugated dienes having 4–12 carbon atoms and one or more monovinylarenes having 8–18 carbon atoms, wherein the coupling agent has the formula:

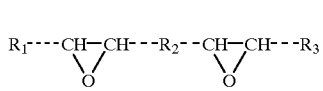
(I)

where $R_1$, $R_3$ are independently selected from the group consisting of aliphatic alkyl and alkenyl, and hydrogen, and $R_2$ is alkylene, alkenylene, divalent cycloalkylene, or divalent arenyl.

* * * * *